(12) United States Patent
Flemming et al.

(10) Patent No.: US 8,539,453 B2
(45) Date of Patent: Sep. 17, 2013

(54) AUTONOMIC I/O TRACING AND PERFORMANCE TUNING

(75) Inventors: Diane G. Flemming, Pflugerville, TX (US); Greg R. Mewhinney, Austin, TX (US); Brian C. Twichell, Austin, TX (US); David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 12/827,662

(22) Filed: Jun. 30, 2010

(65) Prior Publication Data

US 2012/0005580 A1 Jan. 5, 2012

(51) Int. Cl.
G06F 9/44 (2006.01)
G06F 3/00 (2006.01)

(52) U.S. Cl.
USPC .............................. 717/128; 717/158; 710/15

(58) Field of Classification Search
USPC .......... 717/127–128, 158; 719/311; 718/104
See application file for complete search history.

(56) References Cited

U.S. PATENT DOCUMENTS

| 5,887,167 | A | * | 3/1999 | Sutton | 719/314 |
| 5,920,719 | A | * | 7/1999 | Sutton et al. | 717/130 |
| 6,047,124 | A | * | 4/2000 | Marsland | 717/128 |
| 6,094,703 | A | * | 7/2000 | Pawlowski | 711/104 |
| 7,047,521 | B2 | * | 5/2006 | Bunnell | 717/130 |
| 7,458,078 | B2 | * | 11/2008 | DeWitt et al. | 718/104 |
| 7,496,908 | B2 | * | 2/2009 | DeWitt et al. | 717/158 |
| 7,539,932 | B2 | | 5/2009 | Anglin et al. | |
| 7,581,220 | B1 | | 8/2009 | Roeck | |
| 7,987,453 | B2 | * | 7/2011 | DeWitt et al. | 717/133 |
| 2002/0199172 | A1 | * | 12/2002 | Bunnell | 717/128 |
| 2005/0102673 | A1 | * | 5/2005 | DeWitt et al. | 718/100 |
| 2011/0088027 | A1 | * | 4/2011 | Jelvis et al. | 717/174 |

FOREIGN PATENT DOCUMENTS

| JP | 5002515 A | 1/1993 |
| TW | 220350 B | 8/2004 |

OTHER PUBLICATIONS

Choi et al., "Efficient buffer allocation policy for the adaptive block replacement scheme", Journal of KISS: Computer Systems and Theory, vol. 27, No. 3, pp. 324-336, Mar. 2000, South Korea.
Tapus et al., "Active Harmony Towards Automated Performance Tuning", 2002 IEEE, pp. 1-11.
Gunter et al., "On-Demand Grid Application Tuning and Debugging with the NetLogger Activation Service", Proceedings of the 4th International Workshop on Grid Computing, 2003, pp. 1-8.

* cited by examiner

Primary Examiner — Christopher Shin
(74) Attorney, Agent, or Firm — Yee & Associates, P.C.; Libby Z. Toub (57) ABSTRACT

In an embodiment, a kernel performs autonomic input/output tracing and performance tuning. A first table is provided in a device driver framework and a second table in a kernel of a computer. An input/output device monitoring tool is provided in the device driver framework. A plurality of instructions in the kernel compares each value in the first table with each value in the second table. Responsive to a match of a value in the first table and a value in the second table, the kernel automatically runs a command line to perform a system trace, a component trace, or a tuning task. The first table is populated with a plurality of values calculated from a plurality of data in a plurality of device memories and in the controller memory and the second table is populated in accordance with a second plurality of inputs to the command line interface.

16 Claims, 7 Drawing Sheets

AUTONOMIC I/O TRACING AND PERFORMANCE TUNING

BACKGROUND

1. Field

The disclosure relates generally to data processing and more specifically to empowering a computer kernel to make its own decisions in regard to tracing and tuning.

2. Description of the Related Art

Computer performance can be enhanced in a number of ways. One way in which computer performance can be enhanced is by optimizing the performance of input/output (I/O) operations. In a computing environment, input/output refers to communication between a computer and an external environment or another computer. Inputs are the signals received by the computer and the outputs are the signals sent by the computer. Performing I/O means to perform an input or an output operation. For example, a keyboard and a mouse are examples of input devices and a monitor or printer are examples of output devices. Modems or network cards, used for communication between computers are examples of both input devices and output devices.

In order to enhance computer performance by input/output optimization, a trace is run to analyze the input/output operation and find where inefficient time is being spent. For example, if one input/output device is creating a bottleneck for signals from the central processing unit and memory, action can be taken to prevent the bottleneck such as changing the input/output device. Typically, the long latency is detected by a user who then initiates a trace by manually running a trace command. Normally, these traces are captured while an application is running, and the captured trace identifies where the undesirable latency is occurring without difficulty. However, running a trace can be difficult when a problem causing unwanted latencies is intermittent.

A problem causing an unwanted latency is difficult to detect using a trace because the user has to predict when the problem will occur in order to manually start the trace. Such prediction is not always possible. Moreover, when the workload is unfamiliar, such as in a customer production environment, such prediction is even more difficult. The difficulty of predicting when an intermittent problem will occur in order to manually start a trace may be solved by running a continuous trace. But running a continuous trace is not practical because the I/O traces are detailed and create very large amounts of data in only a few seconds. Running a continuous trace is not practical because such a trace consumes many central processing unit cycles which degrades the performance of all applications running on the computer system. Moreover, the continuous trace creates huge output files that may fill trace buffers long before the intermittent latency problem may be solved. Finally, saving the input/output trace buffers because one of them may have captured an intermittent problem is not feasible because the trace logs must be stored which impacts the overall system resources.

Accordingly, it would be advantageous to have a method, system, and program product which take into account one or more of the issues discussed above, as well as possibly other issues.

SUMMARY

An illustrative embodiment provides a method, system, and program product for performing autonomic input/output tracing and performance tuning by a kernel of an operating system of a computer. The computer has at least one processor, at least one device driver framework, and at least one kernel in the operating system and is connected to a plurality of devices connected to the computer. The kernel manages the plurality of devices through the device driver framework and each of the plurality of devices has a device memory. The plurality of devices includes a hard drive having a portion of storage allocated to a controller memory. A first table is provided in the device driver framework and a second table in the kernel. An input/output device monitoring tool is provided in the device driver framework. A plurality of instructions is provided in the kernel to compare each value in the first table with each value in the second table. Responsive to a match of a value in the first table and a value in the second table, the kernel automatically runs a command line to perform a system trace, a component trace, or a tuning task. The first table is populated with a plurality of values calculated by a monitoring tool configured in accordance with a first plurality of inputs to a command line interface and the second table is populated in accordance with a second plurality of inputs to the command line interface.

BRIEF DESCRIPTION OF THE SEVERAL VIEWS OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission medium such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction running system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

Figure 1:
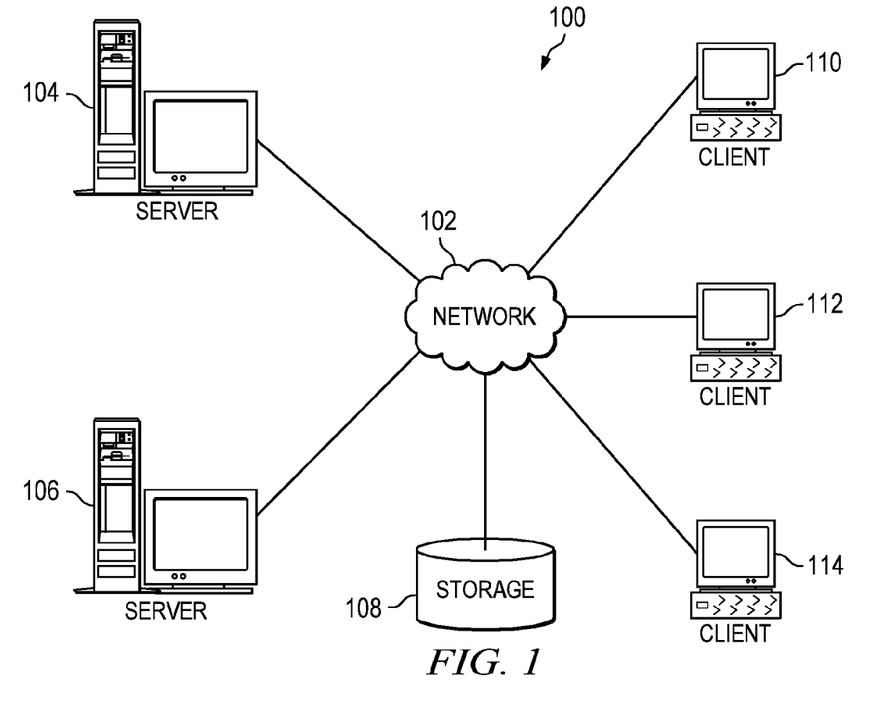
FIG. 1 is a block diagram of a processor system for processing information, in accordance with an illustrative embodiment.

With reference now to the figures and in particular with reference to FIG. 1, an illustrative diagram of a data processing environment is provided in which illustrative embodiments may be implemented. It should be appreciated that FIG. 1 are only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
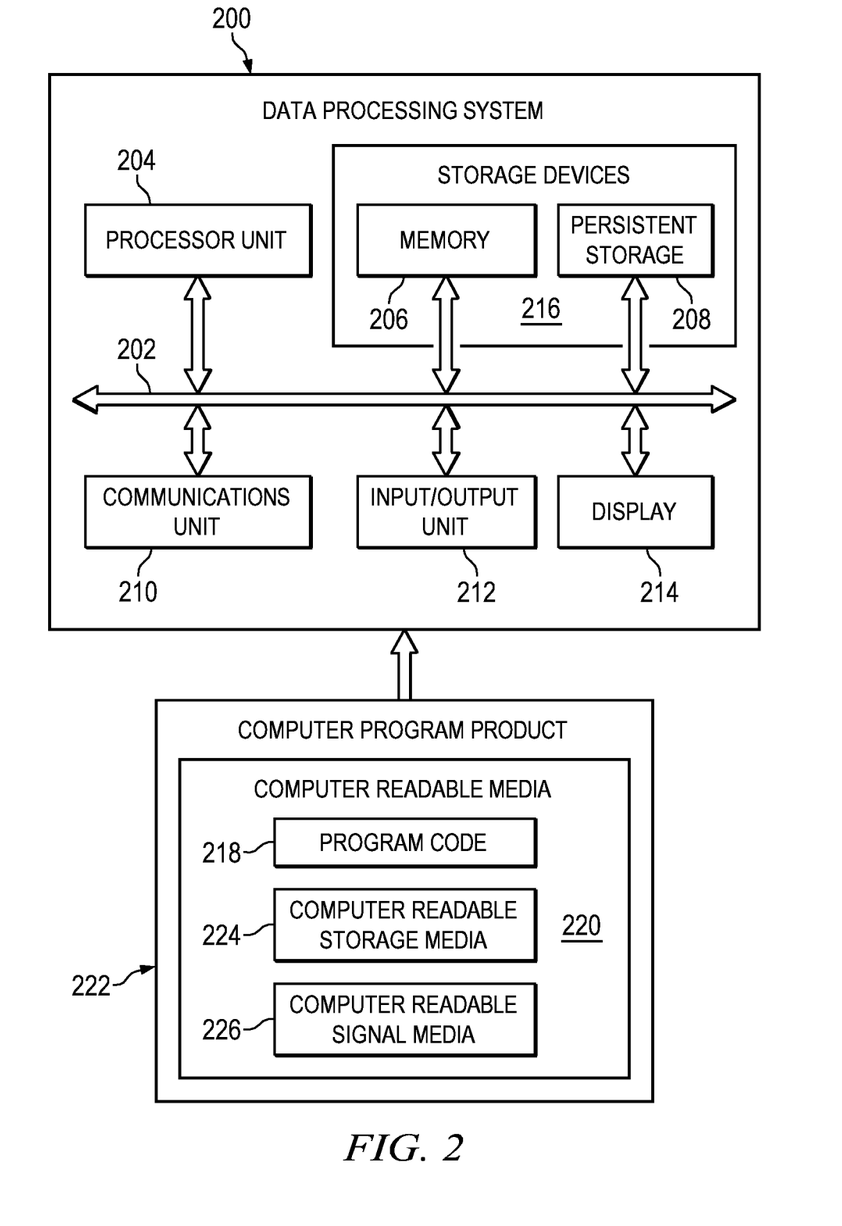
FIG. 2 is a block diagram of a processor system for processing information is depicted in accordance with in illustrative embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage medium, such as memory 206 or persistent storage 208.

Program code 218 is located in a functional form on computer readable medium 220 that is selectively removable and may be loaded onto or transferred to data processing system 200 for running by processor unit 204. Program code 218 and computer readable medium 220 form computer program product 222 in these examples. In one example, computer readable medium 220 may be computer readable storage medium 224 or computer readable signal medium 226. Computer readable storage medium 224 may include, for example, an optical or magnetic disk that is inserted or placed into a drive or other device that is part of persistent storage 208 for transfer onto a storage device, such as a hard drive, that is part of persistent storage 208. Computer readable storage medium 224 also may take the form of a persistent storage, such as a hard drive, a thumb drive, or a flash memory, that is connected to data processing system 200. In some instances, computer readable storage medium 224 may not be removable from data processing system 200. In these illustrative examples, computer readable storage medium 224 is a non-transitory computer readable storage medium.

Alternatively, program code 218 may be transferred to data processing system 200 using computer readable signal medium 226. Computer readable signal medium 226 may be, for example, a propagated data signal containing program code 218. For example, computer readable signal medium 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable medium 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The advantageous embodiments recognize and take into account that the central processing unit and the memory to which the central processing unit can read and write to directly is the origin of signals and sending signals from the central processing unit and its memory to another device such as a disk drive in an input/output operation. The advantageous embodiments recognize and take into account that the central processing unit and its memory communicate through an operating system having a device driver framework and a kernel. The kernel is the part of the operating system that performs basic functions such as allocating hardware resources. The kernel is insulated from outside signals by the device driver framework and receives instructions from the operating system. The kernel has no structure that permits it to act on its own or issue instructions on its own. The kernel is told what to do by the operating system. Therefore, the advantageous embodiments recognize and take into account that a kernel may be modified in order to detect a trigger and to perform an operation in response to the trigger.

Figure 3:
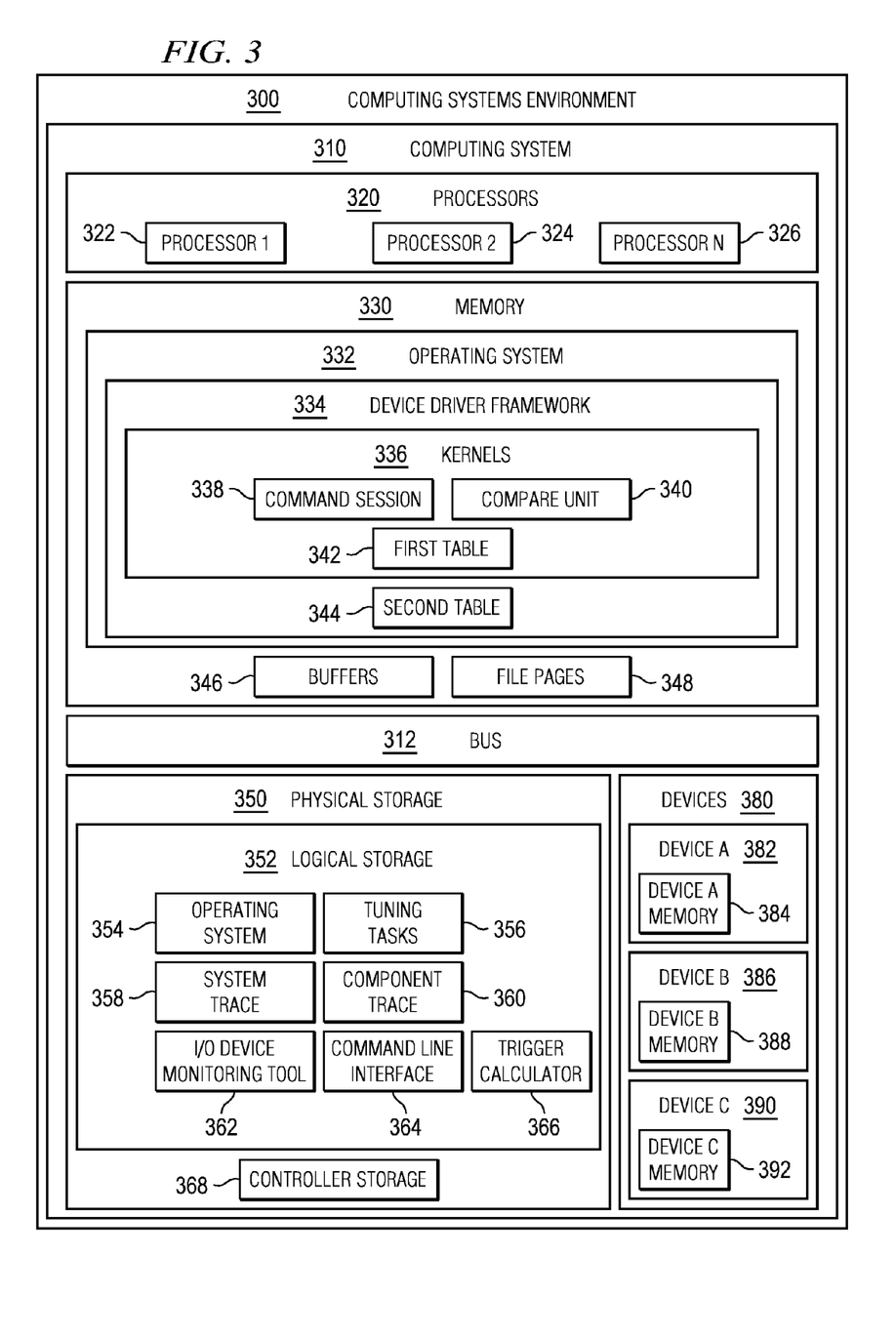
FIG. 3 is a block diagram of a computing systems environment containing a computing system with an autonomic kernel in accordance with an illustrative embodiment.

Turning now to FIG. 3, a block diagram of a computing systems environment containing a computing system with an autonomic kernel is provided in accordance with an illustrative embodiment. Computing systems environment 300 may comprise computing system 310. Computing system 310 may comprise processors 320, memory 330, bus 312, physical storage 350, and devices 380. Processors 320 may comprise one or more processors such as processor 1 322. Processor 2 324 and processor N 326. Processor N 326 is a last processor of any number N of processors in processor 320.

Memory 330 may comprise operating system 332, buffers 346, and file pages 348. Operating system 332 may comprise device driver framework 334. Device driver framework 334 may comprise kernels 336 and second table 344. Kernel 336 may comprise command session 338, compare unit 340, and first table 342.

Physical storage 350 may comprise logical storage 352 and controller storage 368. Logical storage 352 may comprise operating system 354, tuning tasks 356, system trace 358, component trace 360, input/output device monitoring tool 362, command line interface 364, and trigger calculator 366. Devices 380 may comprise device A 382, device B 386, and device C 390. Device A 382 may comprise device A memory 384. Device B 386 may comprise device B memory 388. Device C 390 may comprise device C memory 392. Bus 312 in FIG. 3 may be bus 202 in FIG. 2. Memory 330 in FIG. 3 may be memory 206 in FIG. 2. Physical storage 350 in FIG. 3 may be persistent storage 208 in FIG. 2. Devices 380, such as device A 382, device B 386, and device C 390 may be one or more of storage devices 216, input/output unit 212, display 214, communications unit 210, and computer readable medium 220 in FIG. 2.

Figure 4:
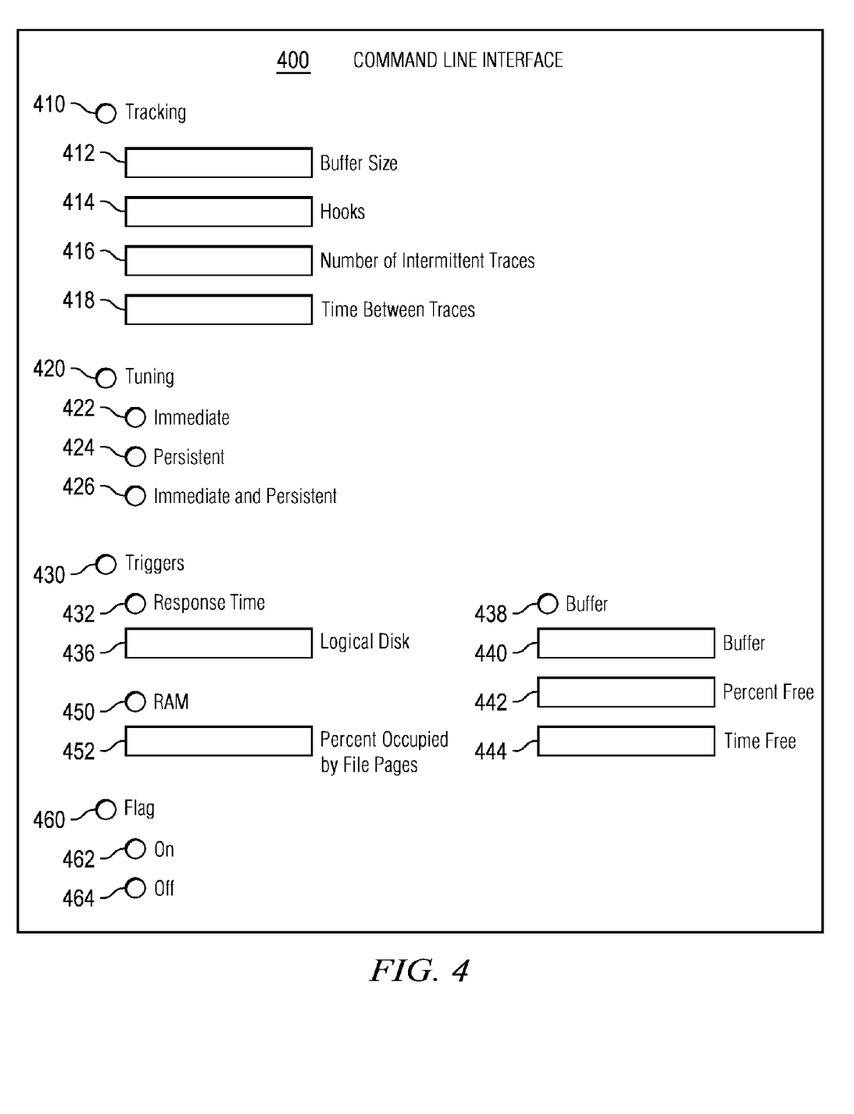
FIG. 4 is an example of a command line interface in accordance with an illustrative embodiment, in accordance with an illustrative embodiment.

Turning now to FIG. 4, an example of a command line interface is provided in accordance with an illustrative embodiment. In the illustrative embodiment, command line interface 400 comprises four configuration components: tracking section 410, tuning section 420, triggers section 430, and RAM section 450.

Tracking section 410 may be selected by activating a radio button or any other activation device. When activated, tracking section 410 receives input in a number of entry windows: buffer size 412 receives a specification of a buffer size, hooks 414 receives a specification of a number of trace hooks 414, number of intermittent traces 416 receives a specification of the number of intermittent traces to be performed, and time between traces 418 receives a specification of the time between traces.

Tuning section 420 may be selected by activating a radio button or any other activation device. When activated, tuning section 420 may receive inputs comprising: a selection of an immediate trace 422, a selection of a persistent trace 424, and a selection of an immediate and a persistent trace 426. Triggers section 430 may be selected by activating a radio button or any other activation device. When activated, triggers section 430 comprises response time section 432, buffer section 438, and RAM section 450.

Response time section 432 may be selected by activating a radio button or by any other activation device. When response time section 432 is selected, command line interface 400 receives input for logical disk response times in logical disk 436.

Buffer section 438 may be selected by activating a radio button or any other activation device. When activated, buffer section receives input for buffer 440, percent free 442 and time free 444. Thus, activation of buffer section 438 would receive a designation of a particular buffer, a trigger value for the percent of free space in the buffer, and a trigger value for the time the percent of the free space has been free.

RAM section 450 may be selected by activating a radio button or any other activation device. When RAM section 450 is selected, command line interface 364 receives an input of a trigger value for the percent of random access memory occupied by file pages in percent occupied by file pages 452. Flag 460 may be set to flag on 462 or flag off 464.

Figure 5:
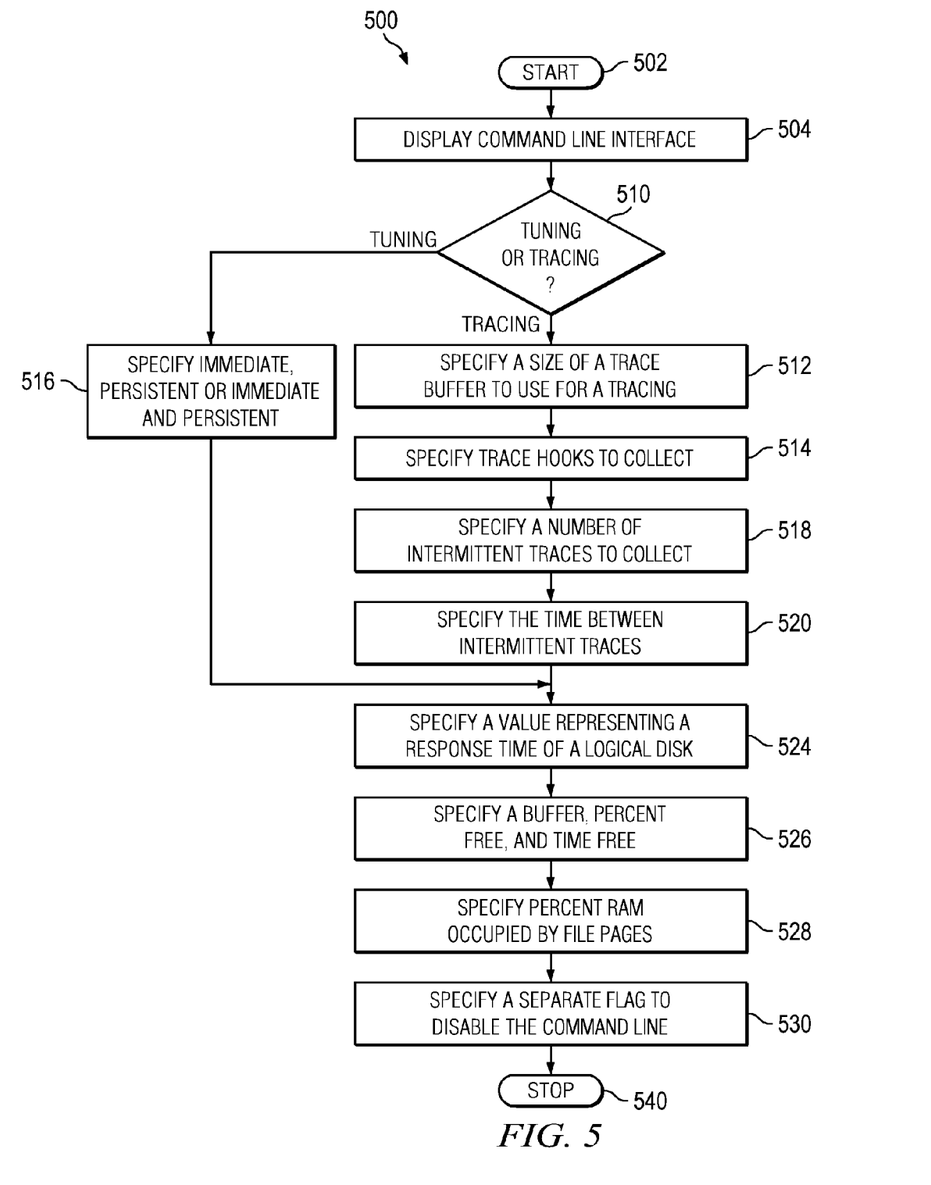
FIG. 5 is a flowchart illustrating configuration of an autonomic kernel using the command line interface in accordance with an illustrative embodiment.

Turning now to FIG. 5, a flowchart illustrating configuration of an autonomic kernel using the command line interface is provided in accordance with an illustrative embodiment. Configuration process 500 starts (step 502) and displays a command line interface (step 504). By way of example, the command line interface may be command line interface 400 in FIG. 4. A determination is made whether tuning or tracing is to be configured (step 510). By way of example, the determination of whether tuning or tracing is to be configured may be made by an activation of tracking 410 or tuning 420 in command line interface 400 of FIG. 4. When at step 510 tracing is selected, a size of a trace buffer to use for a tracing is specified (step 512). By way of example, the size of a trace buffer may be specified in buffer size 412 of command line interface in FIG. 4.

A number of trace hooks to collect is specified (step 514). By way of example, the number of trace hooks may be specified in hooks 414 of command line interface 400 of FIG. 4. A number of intermittent traces to collect is specified (518). By way of example, the number of intermittent traces may be specified in number of intermittent traces 416 of command line interface 400 in FIG. 4. A time between intermittent traces is specified (520). By way of example, the time between intermittent traces may be specified in time between traces 418 of command line interface 400 of FIG. 4. When tuning is selected at step 510, immediate, persistent, or immediate and persistent is specified (516). By way of example, immediate, persistent, or immediate and persistent may be selected by activating immediate 422, persistent 424, or immediate and persistent 426 in command line interface 400 of FIG. 4.

Starting at step 522, configuration process 500 receives specifications of trigger values. A value of a response time of a logical disk is specified (step 524). By way of example, the response time of a logical disk may be specified in logical disk 436 of command line interface of FIG. 4. A buffer is specified, a percent free is specified, and a time free is specified to form a trigger (step 526). By way of example, the buffer may be specified in buffer 440, the percent free may be specified in percent free 442, and the time free may be specified in time free 444 of command line interface 400 of FIG. 4. A percent of random access memory occupied by file pages may be specified (step 528). The percent occupied by file pages may be specified in percent occupied by file pages 452 of command line interface 400. A separate flag is specified to disable the command line (step 530). By way of example, flag 460 may be turned on by radio button 462 or turned off by radio button 464 in command line interface 400 of FIG. 4.

Figure 6:
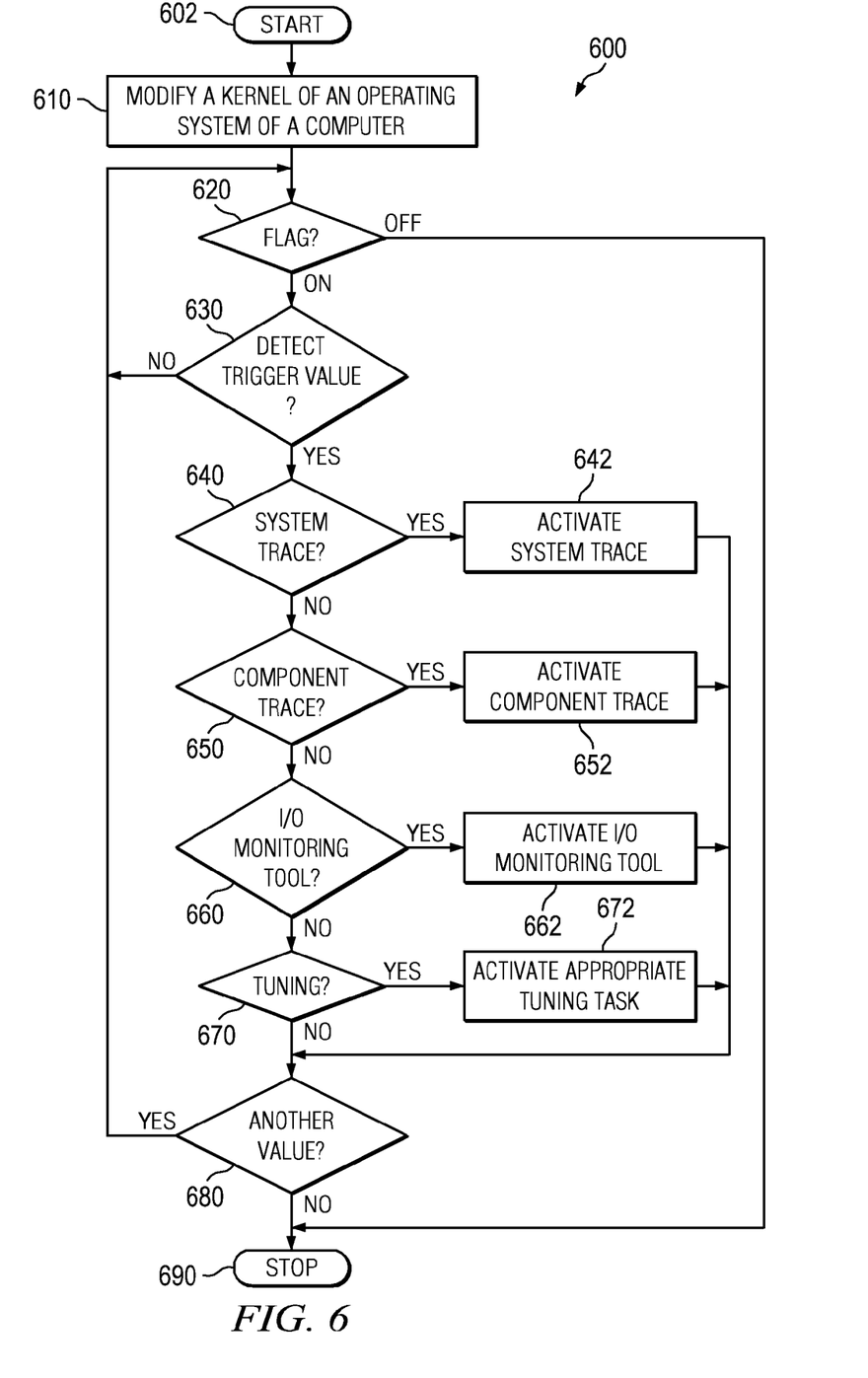
FIG. 6 is a flowchart illustrating the operation of the autonomic kernel for input/output tracing and performance tuning, in accordance with an illustrative embodiment.

Turning now to FIG. 6, a flowchart illustrating the operation of the autonomic kernel for input/output tracing and performance tuning is provided in accordance with an illustrative embodiment. Autonomic kernel operation process 600 starts (602) and a kernel of an operating system of a computer is modified (step 610). The advantageous embodiments recognize and take into account that current kernels are not configured to make decisions on their own and that they are provided with instruction on what to do. Therefore, a kernel must be modified to operate in accordance with the illustrative embodiments. An operating system may be written with an autonomic kernel already in the operating system. A determination is made whether a flag is on or off designating whether the autonomic function of the kernel is on or off (step 620). By way of example, a determination may be made by querying command line interface 400 in FIG. 4 as to which of flag on 462 or flag off 464 has been activated. In an embodiment, flag on may be a default value when no selection has been made in FIG. 4.

Next, a determination is made whether a trigger value has been detected (630). By way of example, the trigger value may be any of triggers 430 in command line interface 400 of FIG. 4 that are specified in steps 522 through 528 of FIG. 500. By way of example, a trigger value may be a response time of a logical disk and may be entered in first table 342 of FIG. 3. A trigger value may be a percentage of a buffer that is free or a percentage of the buffer that has been free for a pre-selected interval of time and may be measured from buffers 346, device A memory 384, device B memory 388, device C memory 392, or controller storage 368 in FIG. 3. Measurements may be made by input/output monitoring tool 362 in FIG. 3. In an embodiment, a trigger value may be a percentage of the computer readable memory occupied by a number of file pages. By way of example, file pages may be file pages 348 in memory 330 in FIG. 3 and may be measured by input/output monitoring tool 362 in FIG. 3.

In an embodiment, a trigger value may be detected by a plurality of instructions in the kernel that compares each value in a first table with each value in a second table, and responsive to a match of a value in the first table and a value in the second table, automatically, by the kernel, running a command session to perform a system trace, a component trace, an activation of an input/output monitoring tool, or a tuning task. The first table may be first table 342 in kernels 336 of FIG. 3. The second table may be second table 344 in device driver framework 334 of FIG. 3. The comparison may be made by compare unit 340 of kernels 336 in FIG. 3. The command session may be command session 338 in kernels 336 in FIG. 3.

A plurality of values calculated by calculator in a storage from a plurality of data in a plurality of device memories and in a controller memory may populate the first table. A second plurality of inputs to the command line interface specifying a plurality of trigger values may populate the second table. Trigger calculator 366 in physical storage 350 in FIG. 3 may calculate the plurality of values for the first table. The device memories may be device memory A 384, device memory B 388, and device memory 392 in FIG. 3. The controller memory may be controller storage 368 in physical storage 350 in FIG. 3.

When no trigger value is detected, autonomic kernel operation process 600 goes to step 680. When a trigger value is detected, a determination is made whether the trigger value calls for a system trace (step 640). When a system trace is called for, autonomic kernel operation process 600 activates an appropriate system trace (step 642) and goes to step 680. When a system trace is not called for, autonomic kernel operation process 600 determines whether a component trace is called for (step 650). When a component trace is called for autonomic kernel operation process 600 activates an appropriate component trace (step 652) and goes to step 680. When a component trace is not called for, autonomic kernel operation process 600 determines whether an input/output monitoring tool is to be activated (step 660).

When an input/output monitoring tool is to be activated, autonomic kernel operation process 600 activates an appropriate input/output monitoring tool (step 662) and goes to step 680. When an input/output monitoring tool is not to be activated at step 660, autonomic kernel operation process 600 determines whether tuning is to be implemented (step 670). When tuning is to be implemented, autonomic kernel operation process 600 activates an appropriate tuning task (step 672) and goes to step 680. When tuning is not to be implemented, autonomic kernel operation process 600 determines whether another trigger value has been detected (step 680). When another trigger value has been detected, autonomic kernel operation process 600 goes to step 620, and when another trigger value has not been detected, stops (step 690).

Figure 7:
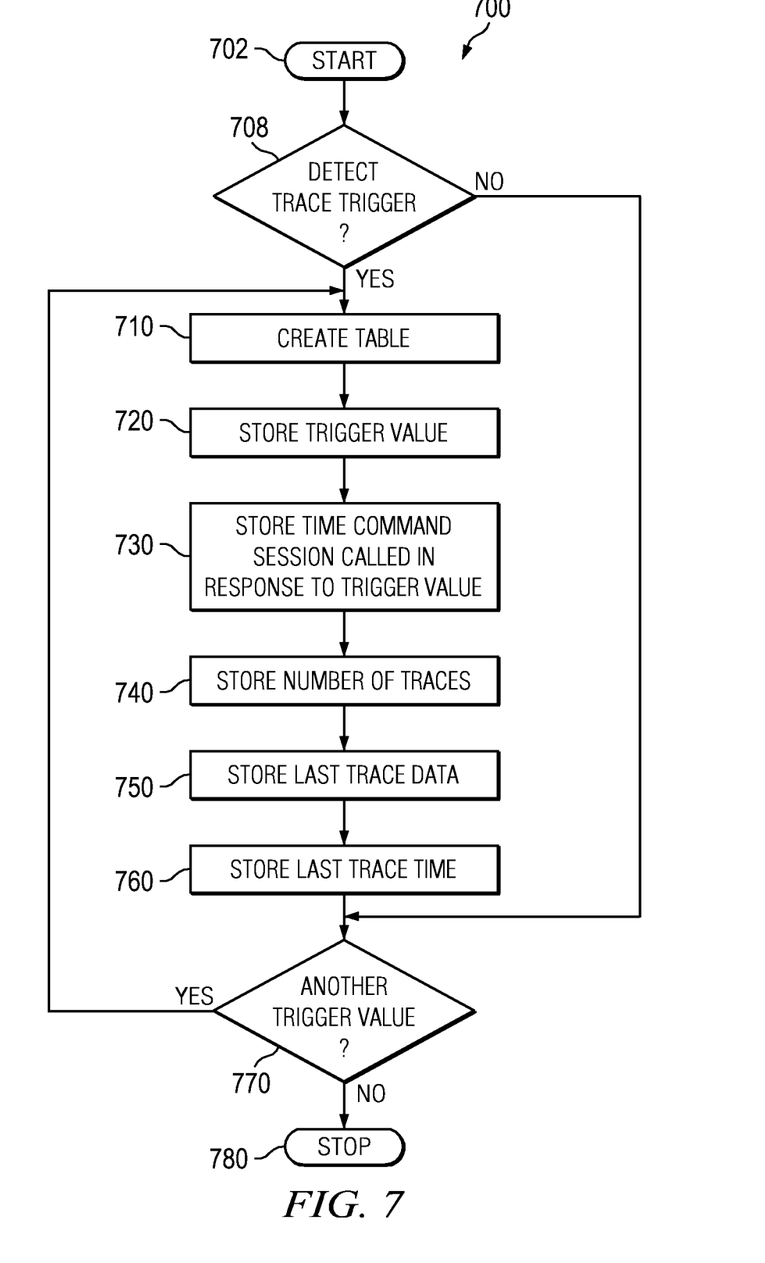
FIG. 7 is a flowchart illustrating the creation of a log table for the autonomic trace data, in accordance with an illustrative embodiment.

Turning now to FIG. 7, a flowchart illustrating the creation of a log table for the autonomic trace data is provided in accordance with an illustrative embodiment. Log table process 700 starts (step 702) and determines whether a trigger value calling for a trace is detected (step 708). Detection of the trigger value calling for a trace may be made by step 630 of autonomic kernel process 600 in FIG. 6. When a trigger value calling for a trace is detected, log table process creates a table (step 710). Log table process stores the trigger value in the table (step 720), stores the time the command session is called in response to the trigger value (step 730), stores the number of traces run (step 740), stores the last trace data (step 750), and stores the last trace time (step 760). Log table process 700 determines whether there is another trigger value detection (step 770). When there is another trigger value detection, log table process 700 goes to step 710. When there is not another trigger value, log table process 700 stops (step 780).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more runable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction running system. For the purposes of this description, a computer-usable or computer readable medium can be any tangible apparatus that can contain, store, communicate, propagate, or transport the program for use by or in connection with the instruction running system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or running program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening non-public or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer system for performing autonomic input/output tracing and performance tuning by a kernel of an operating system, the computer system comprising:
    a computer having at least one processor, at least one operating system, at least one device driver framework, and at least one kernel in the operating system;
    a plurality of devices connected to the computer and managed by the kernel through the device driver framework, wherein each of the plurality of devices has a device memory and the plurality of devices includes a hard drive having a portion of storage allocated to a controller memory;
    an input/output device monitoring tool in the device driver framework;
    a first table in the device driver framework and a second table in the kernel;
    a plurality of instructions in the kernel to compare each value in the first table with each value in the second table, and responsive to a match of a first value in the first table and a second value in the second table, automatically, by the kernel, running a command line to perform a system trace, a component trace, or a tuning task;
    wherein the first table is populated with a first plurality of inputs calculated from a plurality of data in a plurality of device memories and in the controller memory and the second table is populated in accordance with a second plurality of inputs to the command line interface specifying a plurality of trigger values.

2. The computer system of claim 1, wherein the plurality of trigger values includes a response time of a logical disk.

3. The computer system of claim 1, wherein the plurality of trigger values includes a percentage of a buffer that is free or a percentage of the buffer that has been free for a pre-selected interval of time.

4. The computer system of claim 1, wherein the plurality of trigger values includes a percentage of the computer readable memory occupied by a number of file pages.

5. The computer system of claim 1, wherein the command line interface receives an input specifying at least one of the following:
    whether tuning or tracing is performed when a corresponding trigger value is detected;
    a configuration specifying a size of a trace buffer to use for a tracing;
    a configuration specifying during the tracing, which trace hooks to collect, if not all;

a configuration specifying whether when tuning, to apply immediately, persistently across reboots, or both;
a separate flag to disable the command line; and
when tracing, a number of intermittent traces to collect, and when tracing intermittently, the time between the traces.

6. The computer system of claim 1, wherein the command line creates an in-memory table for storing a number of values for a data representing when the command line was called, a number of traces taken, a data and a time a last trace was completed, or an entry for each trigger that spawned a tuning event.

7. A method for performing autonomic input/output tracing and performance tuning by a kernel of an operating system of a computer having at least one processor, at least one device driver framework, and at least one kernel in the operating system and connected to a plurality of devices connected to the computer and managed by the kernel through the device driver framework, each of the plurality of devices having a device memory and the plurality of devices including a hard drive having a portion of storage allocated to a controller memory, the method comprising:
providing a first table in the device driver framework and a second table in the kernel;
providing an input/output device monitoring tool in the device driver framework;
providing a plurality of instructions in the kernel to compare each value in the first table with each value in the second table, and responsive to a match of a first value in the first table and a second value in the second table, automatically, by the kernel, running a command line to perform a system trace, a component trace, or a tuning task; and
populating the first table with a first plurality of inputs calculated from a plurality of data in a plurality of device memories and in the controller memory and the second table is populated in accordance with a second plurality of inputs to the command line interface specifying a plurality of trigger values.

8. The method of claim 7 further comprising:
providing the command line interface for configuration; and
responsive to providing the command line interface, specifying whether tuning or tracing is performed when a corresponding trigger value is detected.

9. The method of claim 7 further comprising:
responsive to providing the command line interface, specifying a size of a trace buffer to use for a tracing.

10. The method of claim 7 further comprising:
responsive to providing the command line interface, specifying during tracing which of a plurality of trace hooks to collect or specifying that during tracing all of the plurality of trace are collected.

11. The method of claim 7 further comprising:
responsive to providing the command line interface specifying whether when tuning, to apply immediately, persistently across reboots, or both;
specifying a separate flag to disable the command line;
specifying, when tracing, a number of intermittent traces to collect, and when tracing intermittently, the time between the traces; and
wherein each of the specifying steps is performed using the command line interface.

12. The method of claim 7 further comprising:
creating a table in the device driver framework; an
storing in the in-memory table, a number of values for a data representing when the command line was called, a number of traces taken, a data and a time a last trace was completed, or an entry for each trigger that spawned a tuning event.

13. A computer program product for providing a command line interface for a kernel of an operating system, the computer program product, comprising:
a computer readable storage;
first program instructions for displaying the command line interface for configuring a command line of a kernel of the operating system;
second program instructions for configuring, using the command line interface, a first trigger value comprising a response time of a logical disk;
third program instructions for configuring, using the command line interface, a second trigger value comprising a percentage of a buffer that is free or a percentage of the buffer that has been free for a pre-selected interval of time; and
fourth program instructions for configuring, using the command line interface, a third trigger value comprising a percentage of the computer readable memory occupied by a number of file pages;
wherein the first, second, third, and fourth program instructions are stored on the computer readable storage.

14. The computer program product of claim 13 further comprising:
fifth program instructions for configuring, using the command line interface, the operation to be a system trace, a component trace, a monitoring by an input/output device monitoring tool, or a tuning task;
sixth program instructions for configuring, using the command line interface, a size of a trace buffer to use for a tracing;
seventh program instructions for configuring, using the command line interface, one or more trace hooks to collect during tracing; and
eighth program instructions for configuring, using the command line interface, whether tuning is to be applied immediately upon detection of the trigger value, to be applied persistently across reboots upon detection of the trigger value, and to be applied both immediately and persistently across reboots;
wherein the fifth, sixth, seventh, and eighth program instructions are stored on the computer readable storage.

15. The computer program product of claim 14 further comprising:
ninth program instructions for configuring, using the command line interface, a flag to disable the command line; and
tenth program instructions for configuring, using the command line interface, a number of intermittent traces to collect during tracing, and, when tracing intermittently, a time between each trace;
wherein the ninth and tenth program instructions are stored on the computer readable storage.

16. The computer program product of claim 15 further comprising:
eleventh program instructions for creating a table in the kernel; and
twelfth program instructions for storing in the table, a number of values for a data representing a time when the command line was called, a number of traces taken, a time a last trace was completed, or an entry for each trigger that spawned a tuning event;

wherein the eleventh and twelfth program instructions are stored on the computer readable storage.

* * * * *